United States Patent
Kamoshida et al.

(10) Patent No.: US 10,408,510 B2
(45) Date of Patent: Sep. 10, 2019

(54) EVAPORATOR

(71) Applicant: KEIHIN THERMAL TECHNOLOGY CORPORATION, Oyama-shi (JP)

(72) Inventors: Osamu Kamoshida, Oyama (JP); Naohisa Higashiyama, Oyama (JP); Motoyuki Takagi, Oyama (JP)

(73) Assignee: KEIHIN THERMAL TECHNOLOGY CORPORATION, Oyama-Shi (JP)

( * ) Notice: Subject to any disclaimer, the term of this patent is extended or adjusted under 35 U.S.C. 154(b) by 133 days.

(21) Appl. No.: 15/844,622

(22) Filed: Dec. 18, 2017

(65) Prior Publication Data

US 2018/0180335 A1 Jun. 28, 2018

(30) Foreign Application Priority Data

Dec. 28, 2016 (JP) ................... 2016-255489

(51) Int. Cl.
| | | |
|---|---|---|
| *F25B 39/00* | (2006.01) | |
| *B60H 1/32* | (2006.01) | |
| *F28D 1/053* | (2006.01) | |
| *F25B 39/02* | (2006.01) | |
| *F28D 21/00* | (2006.01) | |

(52) U.S. Cl.
CPC ......... *F25B 39/00* (2013.01); *B60H 1/3227* (2013.01); *F28D 1/05391* (2013.01); *F25B 39/028* (2013.01); *F28D 2021/0085* (2013.01)

(58) Field of Classification Search
CPC ........ F28D 1/05391; F28D 2021/00085; F28F 9/0204; F28F 9/0207; F25B 39/028
USPC ............................................ 165/174; 62/525
See application file for complete search history.

(56) References Cited

U.S. PATENT DOCUMENTS

| | | | | |
|---|---|---|---|---|
| 6,272,881 B1* | 8/2001 | Kuroyanagi | ............ | F28D 1/035 165/153 |
| 6,449,979 B1* | 9/2002 | Nagasawa | ............. | F28D 1/0391 62/503 |
| 2005/0247443 A1* | 11/2005 | Kim | ................... | F28D 1/05391 165/176 |
| 2009/0166017 A1 | 7/2009 | Katoh | | |

(Continued)

FOREIGN PATENT DOCUMENTS

| | | |
|---|---|---|
| JP | 2009-156532 | 7/2009 |
| JP | 2015-157507 | 9/2015 |

*Primary Examiner* — Allen J Flanigan
(74) *Attorney, Agent, or Firm* — Mori & Ward, LLP

(57) ABSTRACT

An evaporator includes a first descending flow tube group between a first upper header and a first lower header, and a second descending flow tube group between a second upper header and a second lower header to be located windward of the first descending flow tube group. The first upper header includes a first compartment, and the second upper header includes a third compartment. A flow distribution control section for reinforcement having a refrigerant passage section for communication between the first and third compartments is disposed between the two compartments to extend over the entire lengths and heights of the two compartments. The refrigerant passage section is composed of a plurality of through holes formed in the flow distribution control section for reinforcement. The total area of the through holes is greater than that of the refrigerant passages of the heat exchange tubes of the first descending flow tube group.

6 Claims, 7 Drawing Sheets

(56) References Cited

U.S. PATENT DOCUMENTS

| | | | |
|---|---|---|---|
| 2010/0147501 A1* | 6/2010 | Art | F28D 1/05391 |
| | | | 165/175 |
| 2011/0139413 A1* | 6/2011 | Coyle | F28D 1/05391 |
| | | | 165/148 |
| 2011/0303401 A1* | 12/2011 | Kamoshida | B60H 1/00335 |
| | | | 165/173 |
| 2012/0096894 A1* | 4/2012 | Higashiyama et al. | |
| | | | F25B 39/02 |
| | | | 62/525 |
| 2015/0241080 A1 | 8/2015 | Takagi | |

* cited by examiner

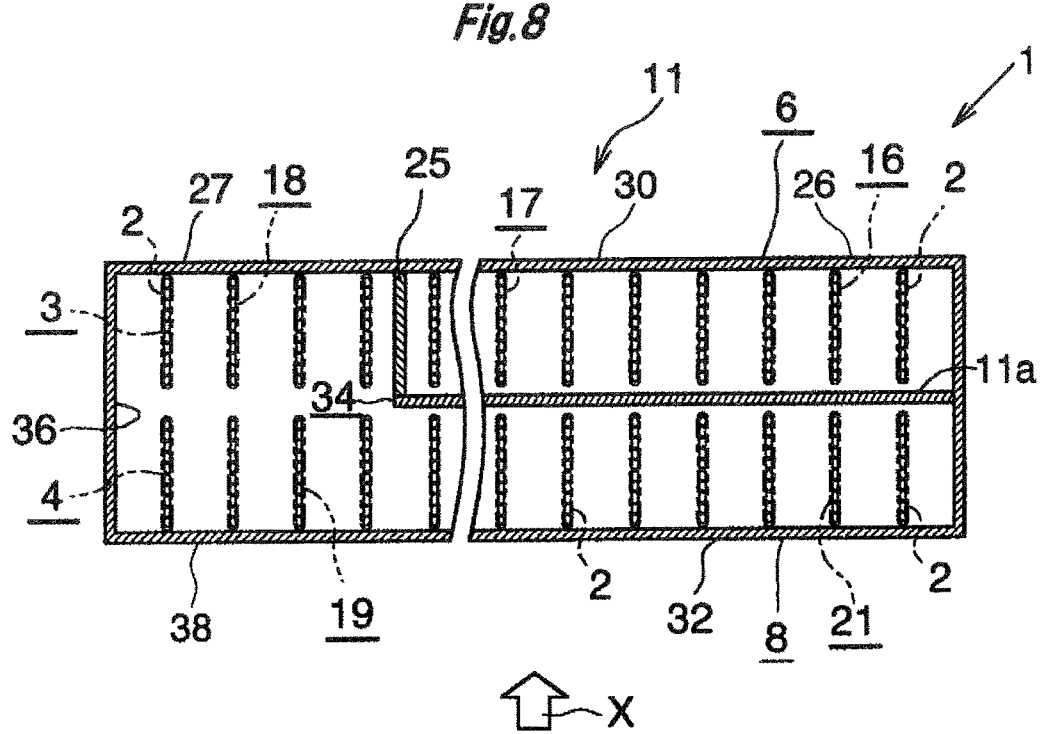

EVAPORATOR

BACKGROUND OF THE INVENTION

The present invention relates to an evaporator suitable for use in a car air conditioner, which is a refrigeration cycle to be mounted on an automobile, for example.

In this specification and appended claims, the upper, lower, left-hand, and right-hand sides of FIGS. 1 to 4 will be referred to as "upper," "lower," "left," and "right," respectively, and a direction represented by arrow X in FIGS. 1 and 2 will be referred to as an "air-passage direction."

An evaporator of such a type has been known (see Japanese Patent Application Laid-Open (kokai) No. 2009-156532). The known evaporator comprises leeward and windward tube rows each of which is composed of a plurality of heat exchange tubes disposed such that their longitudinal direction coincides with the vertical direction and they are spaced from one another in the left-right direction, and which are disposed side by side in the air-passage direction; leeward upper and lower headers with which upper and lower end portions of the heat exchange tubes of the leeward tube row communicate, respectively; and windward upper and lower headers with which upper and lower end portions of the heat exchange tubes of the windward tube row communicate, respectively. In the two tube rows, descending flow tube groups each of which is composed of a plurality of heat exchange tubes and in which refrigerant flows from the upper side toward the lower side and ascending flow tube groups each of which is composed of a plurality of heat exchange tubes and in which the refrigerant flows from the lower side toward the upper side are arranged alternately. The leeward tube row includes three tube groups, and the windward tube row includes two tube groups. A refrigerant inlet is provided at one end of the leeward upper header, and a refrigerant outlet is provided at one end of the windward upper header, which one end is located on the same side as the side where the refrigerant inlet is provided. In the leeward tube row, a nearest tube group which is the nearest to the refrigerant inlet and a farthest tube group which is the farthest from the refrigerant inlet are descending flow tube groups in which the refrigerant flows from the upper side toward the lower side, and an intermediate tube group between the two descending flow tube groups is an ascending flow tube group in which the refrigerant flows from the lower side toward the upper side. In the windward tube row, a nearest tube group which is the nearest to the refrigerant outlet is an ascending flow tube group in which the refrigerant flows from the lower side toward the upper side, and a farthest tube group which is the farthest from the refrigerant outlet is a descending flow tube group. The farthest tube group of the windward tube row is disposed on the windward side of the farthest tube group of the leeward tube row, and the two farthest tube groups constitute a single path. An upper end portion of the farthest tube group of the leeward tube row and an upper end portion of the intermediate tube group located adjacent to and upstream of the farthest tube group in the flow direction of the refrigerant communicate with one leeward compartment which is provided in the leeward upper header and which is closed at opposite ends thereof. An upper end portion of the farthest tube group of the windward tube row communicates with one windward compartment which is provided in the windward upper header, which is closed at opposite ends thereof, and which is shorter in length in the left-right direction than the leeward compartment. The entire leeward compartment and the entire windward compartment constitute a single space, and a refrigerant passage section is provided so as to establish communication between the windward compartment and a portion of the leeward compartment with which the farthest tube group communicates. The refrigerant having flowed into the leeward compartment from the intermediate tube group of the leeward tube row flows toward the farthest tube group side of the leeward compartment, flows downward within the heat exchange tubes of the farthest tube group. Simultaneously with this, the refrigerant having flowed into the leeward compartment from the intermediate tube group of the leeward tube row flows into the windward compartment through the refrigerant passage section, while flowing toward the farthest tube group side of the leeward compartment, and then flows downward within the heat exchange tubes of the farthest tube group of the windward tube row.

In the case of the evaporator disclosed in the above-mentioned publication, in the leeward compartment of the leeward upper header, the refrigerant having flowed from the intermediate tube group of the leeward tube row into the leeward compartment and having flowed toward the farthest tube group side of the leeward compartment flows more easily into the heat exchange tubes of the farthest tube group of the leeward tube row than into the descending flow tube group of the windward tube row through the refrigerant passage section. As a result, the amounts of the refrigerant flowing through the heat exchange tubes of the two farthest tube groups forming the single path become non-uniform.

Therefore, in order to improve cooling performance, it is desired to equalize the amounts of the refrigerant flowing through the heat exchange tubes of the farthest tube groups of the leeward tube row and the windward tube row which are the same in terms of the flow direction of the refrigerant within the heat exchange tubes.

Incidentally, there has been known an evaporator in which the leeward upper header and the windward upper header are provided by dividing the interior of a single tank, in the air-passing direction, into two spaces by a partition portion extending in the left-right direction and a refrigerant passage section for establishing communication between the windward compartment and the region of the leeward compartment with which the farthest tube group communicates is formed by removing the partition portion over the entire length of the windward compartment (see Japanese Patent Application Laid-Open (kokai) No. 2015-157507).

In the evaporator disclosed in Japanese Patent Application Laid-Open No. 2015-157507, refrigerant flows more easily into the windward compartment through the refrigerant passage section than into the descending flow tube group in the leeward tube row, which group constitutes the above-mentioned single path, whereby it becomes easier for the refrigerant to flow into the descending flow tube group in the windward tube row, which group constitutes the above-mentioned single path. As a result, the amounts of refrigerant flowing through the heat exchange tubes of the farthest tube groups of the leeward tube row and the windward tube row can be made uniform. However, the amount of refrigerant flowing through the descending flow tube group of the windward tube row, which group constitutes the above-mentioned single path, may become greater than the amount of refrigerant flowing through the descending flow tube group of the leeward tube row, which group constitutes the above-mentioned single path. In addition, the withstand pressure of the tank having the leeward upper header tank and the windward upper header tank may decrease.

SUMMARY OF THE INVENTION

An object of the present invention is to solve the above problem and to provide an evaporator which can enhance cooling performance by equalizing the amounts of refrigerant flowing through heat exchange tubes of two descending flow tube groups which are provided side-by-side in an air-passage direction and constitute a single path.

An evaporator according to the present invention comprises a first upper header; a first lower header disposed below the first upper header to be parallel to the first upper header; a plurality of first heat exchange tubes which are disposed between the first upper header and the first lower header and whose upper and lower end portions are connected to the first upper header and the first lower header, respectively; a first descending flow tube group which is composed of a plurality of the first heat exchange tubes and in which refrigerant flows from an upper side toward a lower side thereof; a first ascending flow tube group which is composed of a plurality of the first heat exchange tubes, in which the refrigerant flows from a lower side toward an upper side thereof, and which is provided adjacent to the first descending flow tube group; a first compartment which is provided in the first upper header and with which an upper end portion of the first descending flow tube group communicates; and a second compartment which is provided in the first upper header to be located adjacent to the first compartment, with which an upper end portion of the first ascending flow tube group communicates, and from which the refrigerant flows out toward the first compartment. Also, the evaporator according to the present invention comprises a second upper header disposed to be parallel to the first upper header; a second lower header disposed below the second upper header to be parallel to the second upper header and the first lower header; a plurality of second heat exchange tubes which are disposed between the second upper header and the second lower header and whose upper and lower end portions are connected to the second upper header and the second lower header, respectively; a second descending flow tube group which is composed of a plurality of the second heat exchange tubes, in which the refrigerant flows from an upper side toward a lower side thereof, and which is provided oppose to the first descending flow tube group in an air-passage direction; a third compartment which is provided in the second upper header and with which an upper end portion of the second descending flow tube group communicates; and a flow distribution control section for reinforcement which is provided between the first compartment and the third compartment such that the flow distribution control section extends over the entire lengths and heights of the first compartment and the third compartment and which has a refrigerant passage section for establishing communication between the first compartment and the third compartment. Upper end portions of the heat exchange tubes of the first descending flow tube group, which portions have a predetermined length, are intruded into the first compartment, and upper end portions of the heat exchange tubes of the second descending flow tube group, which portions have a predetermined length, are intruded into the third compartment. The refrigerant passage section is composed of a plurality of through holes formed in the flow distribution control section for reinforcement at intervals in the longitudinal direction of the two upper headers, the lower end of each through hole is separated upward from the bottoms of the first and third compartments, and the lower ends of all the through holes which constitute the refrigerant passage section are located at a vertical position below the upper ends of all the heat exchange tubes of the first and second descending flow tube groups. A relation of A>B is satisfied where A represents the total area of all the through holes which constitute the refrigerant passage section, and B represents the total passage sectional area of the refrigerant passages of all the heat exchange tubes of the first descending flow tube group.

BRIEF DESCRIPTION OF THE DRAWINGS

FIG. 8 is a sectional view taken along line D-D of FIG. 3.

DESCRIPTION OF THE PREFERRED EMBODIMENT

Figure 1:
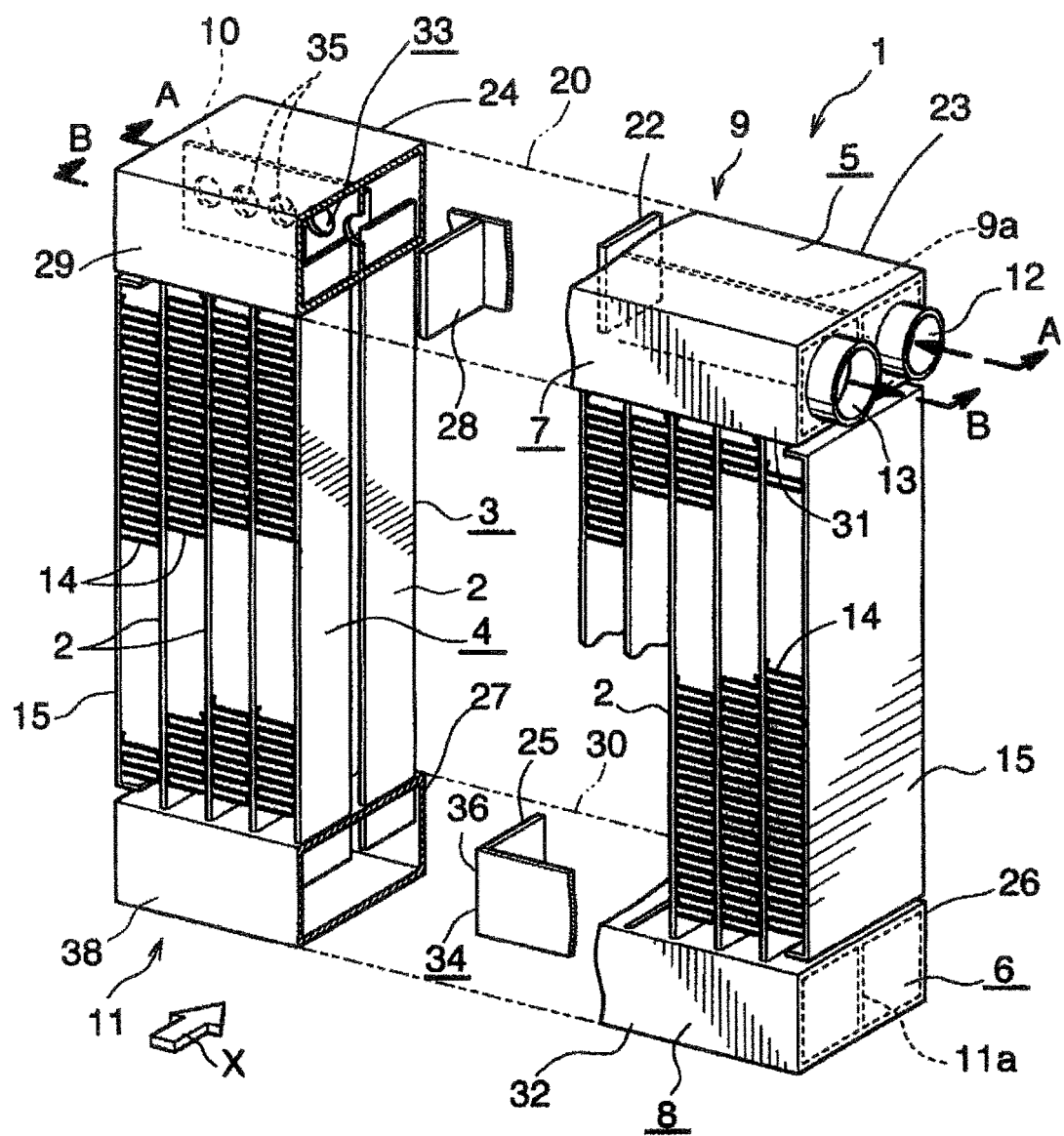
FIG. 1 is a partially cut-away perspective view showing the overall structure of an evaporator according to the present invention.

An embodiment of the present invention will next be described with reference to the drawings. In the embodiment which will be described below, the evaporator of the present invention is applied to a refrigeration cycle which constitutes a car air conditioner.

In the following description, the term "aluminum" encompasses aluminum alloys in addition to pure aluminum.

FIGS. 1 to 4 show the overall structure of the evaporator of the present invention, and FIGS. 5 to 8 show the configurations of essential portions of the evaporator. Notably, in FIG. 2, heat exchange tubes, fins, etc. are not illustrated.

As shown in FIGS. 1 to 4, an evaporator 1 includes a leeward upper header 5 (first upper header) which is formed of aluminum and whose longitudinal direction coincides with a left-right direction; a leeward lower header 6 (first lower header) which is formed of aluminum, whose longitudinal direction coincides with the left-right direction, and which is disposed below the leeward upper header 5 to be parallel to the leeward upper header 5; a windward upper header 7 (second upper header) which is formed of aluminum, whose longitudinal direction coincides with the left-right direction, and which is disposed on the windward side of the leeward upper header 5 to be parallel to the leeward upper header 5; a windward lower header 8 (second lower header) which is formed of aluminum, whose longitudinal direction coincides with the left-right direction, and which is disposed below the windward upper header 7 and on the windward side of the leeward lower header 6 to be parallel to the windward upper header 7 and the leeward lower header 6; a plurality of leeward heat exchange tubes 2 (first heat exchange tubes) which are formed of aluminum and are disposed between the leeward upper header 5 and the leeward lower header 6 and whose upper and lower end portions are connected to the leeward upper header 5 and the leeward lower header 6, respectively; and a plurality of windward heat exchange tubes 2 (second heat exchange tubes) which are formed of aluminum and are disposed between the windward upper header 7 and the windward lower header 8 and whose upper and lower end portions are connected to the windward upper header 7 and the windward lower header 8, respectively.

Figure 2:
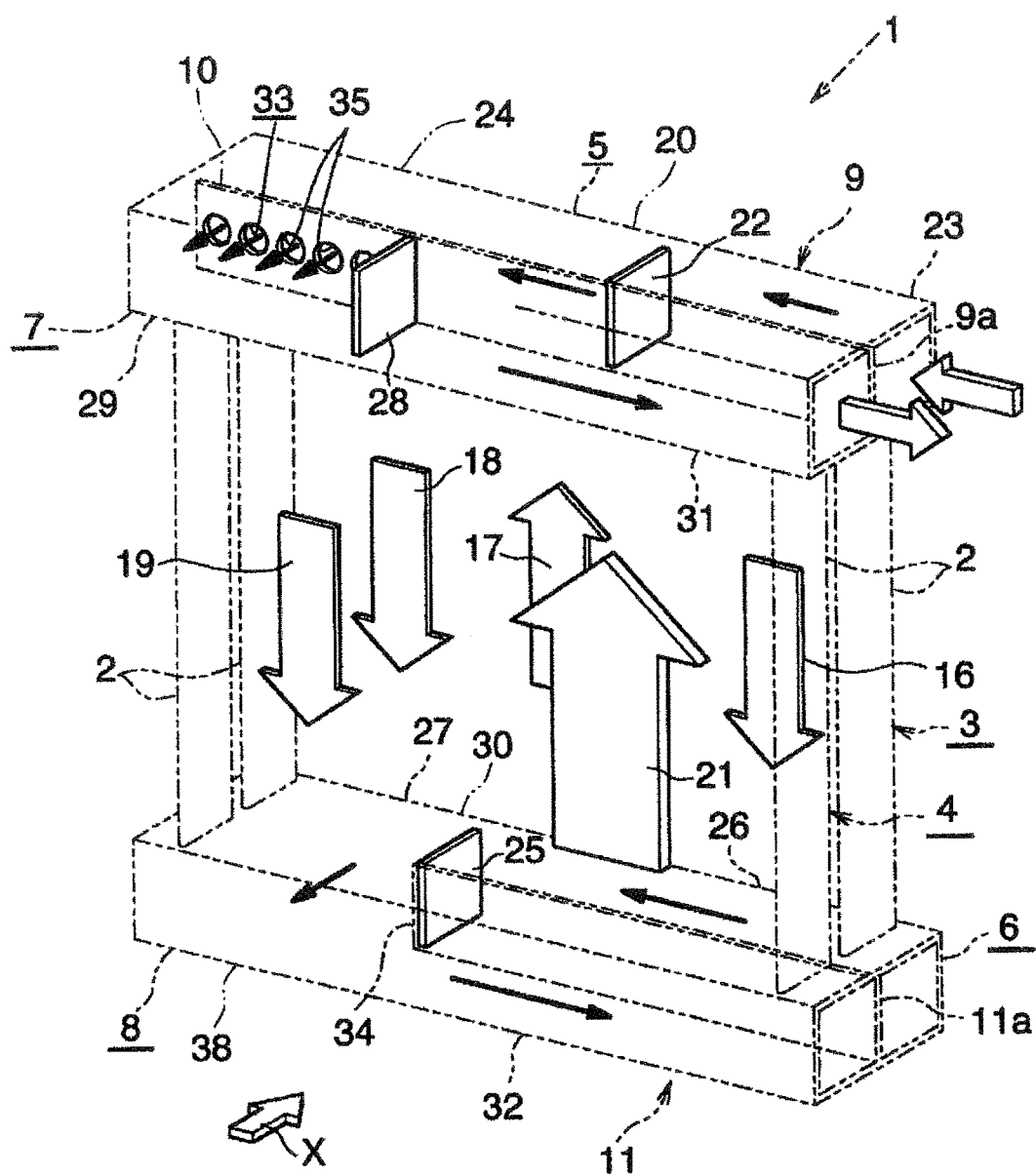
FIG. 2 is a perspective view schematically showing the overall structure of the evaporator of FIG. 1 and showing the flow of refrigerant.
Figure 3:
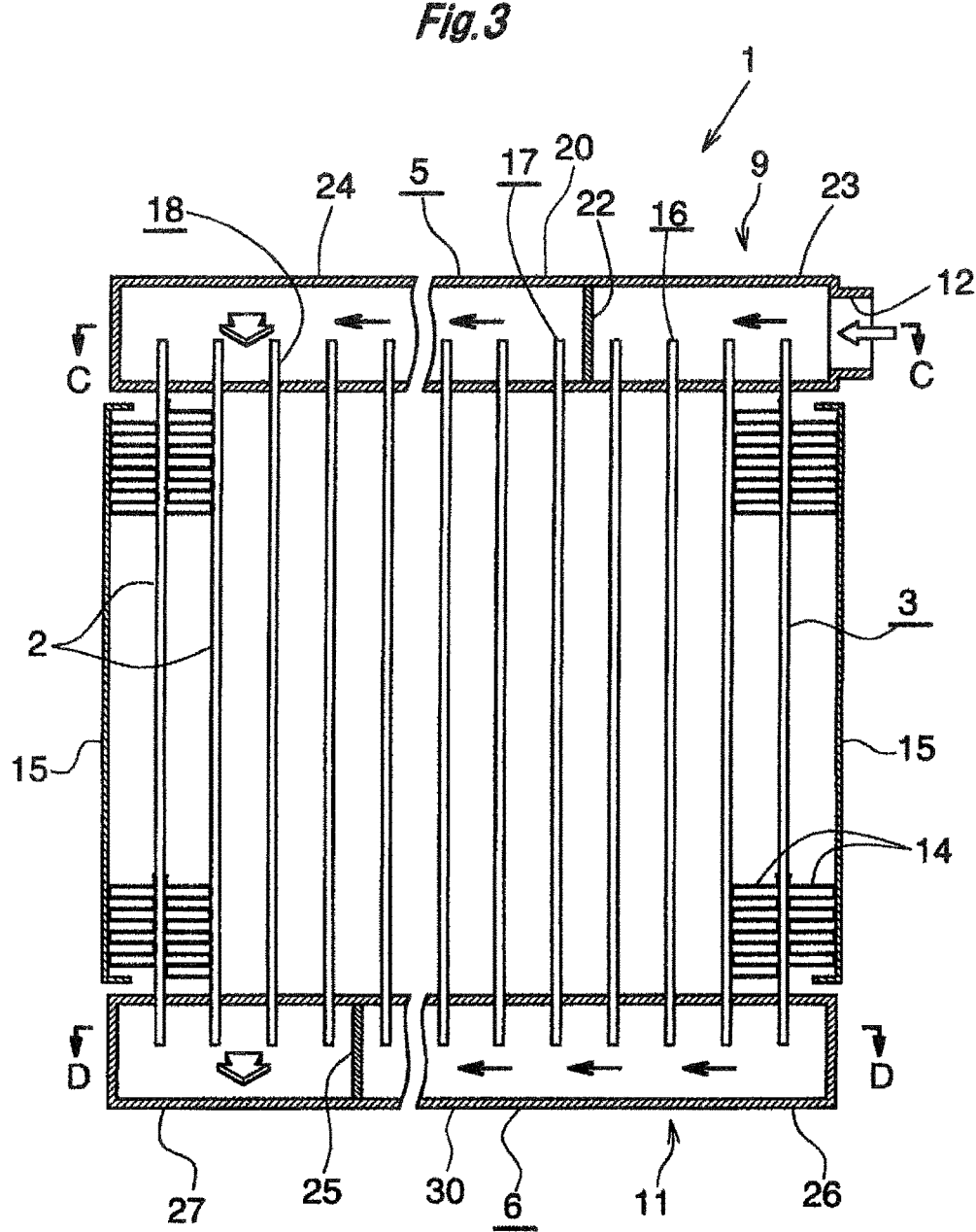
FIG. 3 is a sectional view taken along line A-A of FIG. 1.
Figure 4:
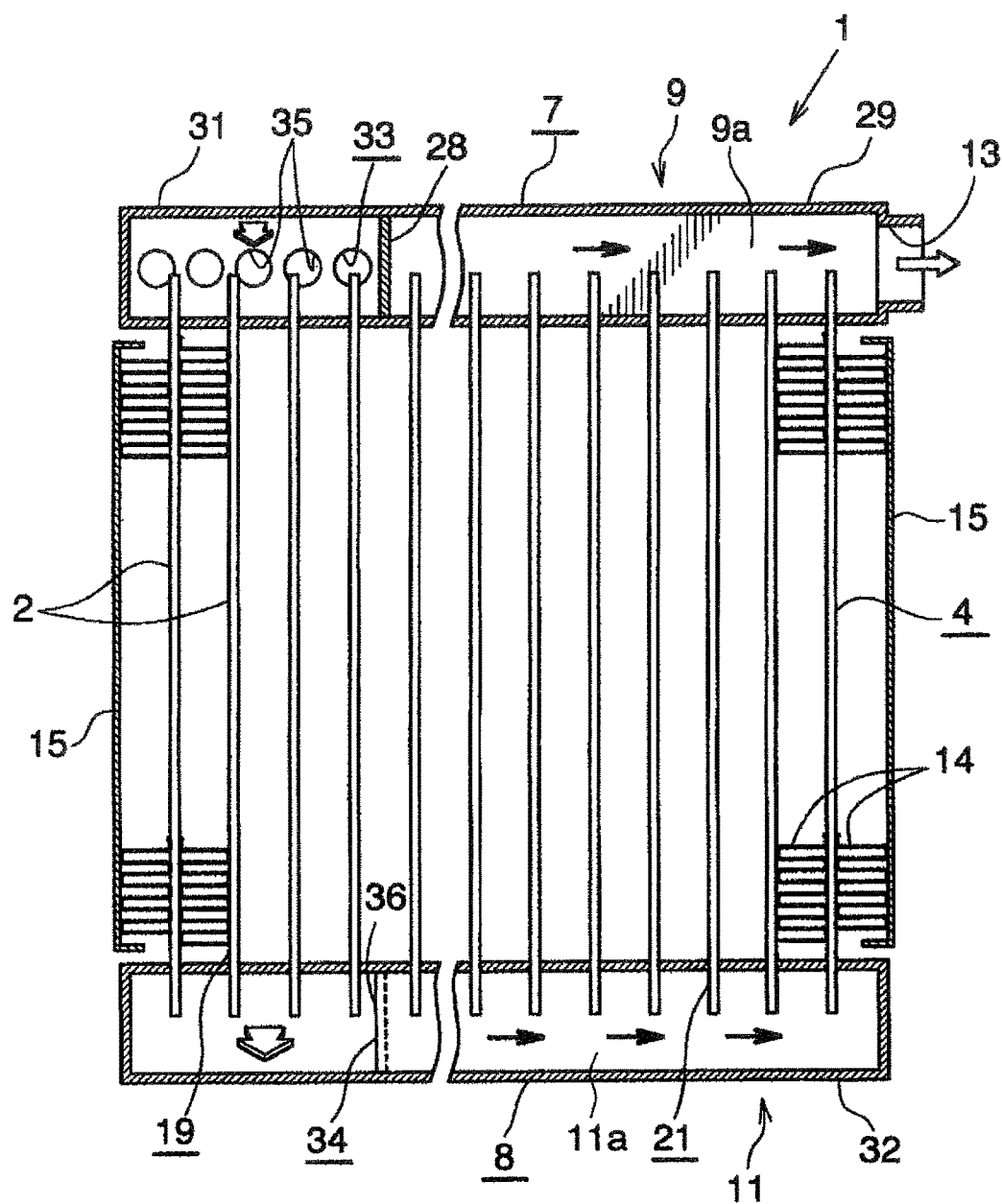
FIG. 4 is a sectional view taken along line B-B of FIG. 1.

The heat exchange tubes 2 are flat and are disposed in such a manner that their width direction coincides with the air-passage direction indicated by arrow X in FIGS. 1 and 2 and their longitudinal direction coincides with the vertical direction and that they are spaced from one another in the left-right direction (direction perpendicular to the air-passage direction). A leeward tube row 3 is formed by the heat exchange tubes 2 disposed between the leeward upper header 5 and the leeward lower header 6, and a windward tube row 4 is formed by the heat exchange tubes 2 disposed between the windward upper header 7 and the windward lower header 8.

The leeward upper header 5 and the windward upper header 7 are provided, for example, by dividing the interior of a single tank 9, in the air-passage direction, into two spaces by a plate-shaped partition portion 9a extending in the left-right direction. Similarly, the leeward lower header 6 and the windward lower header 8 are provided, for example, by dividing the interior of a single tank 11, in the air-passage direction, into two spaces by a plate-shaped partition portion 11a extending in the left-right direction. A refrigerant inlet 12 is provided at a right end portion of the leeward upper header 5, and a refrigerant outlet 13 is provided at a right end portion of the windward upper header 7. All the heat exchange tubes 2 of the leeward tube row 3 and the windward tube row 4 are joined to the two tanks 9 and 11 through use of a brazing material in a state in which their upper and lower end portions having a predetermined length have been intruded into the two upper headers 5 and 7 and the two lower headers 6 and 8, respectively. In the following description, joining through use of a brazing material will be referred to as "brazing." The upper ends of all the heat exchange tubes 2 are located at the same vertical position, and the lower ends of all the heat exchange tubes 2 are located at the same vertical position. Notably, in some cases, the vertical positions of the upper ends of all the heat exchange tubes 2 may slightly differ from one another, and the vertical positions of the lower ends of all the heat exchange tubes 2 may slightly differ from one another. The number of the heat exchange tubes 2 of the leeward tube row 3 is equal to the number of the heat exchange tubes 2 of the windward tube row 4.

The evaporator 1 includes corrugated fins 14 formed of aluminum and side plates 15 formed of aluminum. Each corrugated fin 14 is disposed in air-passing clearances between adjacent heat exchange tubes 2 of the tube rows 3 and 4 or externally of the left- or right-end heat exchange tubes 2 such that the corrugated fin 14 extends over the heat exchange tubes 2 of the two tube rows 3 and 4, and is brazed to the corresponding heat exchange tubes 2. The side plates 15 are disposed externally of the left- and right-end corrugated fins 14, and are brazed to the corresponding corrugated fins 14. The spaces between the left- and right-end heat exchange tubes 2 and the corresponding side plates 15 also serve as air-passing clearances. Air having passed through the air-passing clearances between the adjacent heat exchange tubes 2 of the two tube rows 3 and 4 is fed into a passenger compartment of a vehicle on which a vehicular air conditioner is mounted.

The leeward tube row 3 includes a first descending flow tube group 18 which is composed of a plurality of successively arranged heat exchange tubes 2, in which the refrigerant flows from the upper side toward the lower side, and which is provided on the left end side (the side opposite the refrigerant inlet 12); and a first ascending flow tube group 17 which is composed of a plurality of successively arranged heat exchange tubes 2, in which the refrigerant flows from the lower side toward the upper side, and which is provided adjacent to and on the right side (the refrigerant inlet 12 side) of the first descending flow tube group 18. The windward tube row 4 includes a second descending flow tube group 19 which is composed of a plurality of successively arranged heat exchange tubes 2, in which the refrigerant flows from the upper side toward the lower side, and which is provided side by side on the windward side of the first descending flow tube group 18. Also, the leeward tube row 3 includes a third descending flow tube group 16 which is composed of a plurality of successively arranged heat exchange tubes 2, in which the refrigerant flows from the upper side toward the lower side, and which is provided adjacent to and on the right side of the first ascending flow tube group 17, and the windward tube row 4 includes a second ascending flow tube group 21 which is composed of a plurality of successively arranged heat exchange tubes 2, in which the refrigerant flows from the lower side toward the upper side, and which is provided adjacent to and on the right side of the second descending flow tube group 19.

The first descending flow tube group 18 is a farthest tube group in the leeward tube row 3 which is the farthest from the refrigerant inlet 12, and the third descending flow tube group 16 is a nearest tube group in the leeward tube row 3 which is the nearest to the refrigerant inlet 12. Also, the second descending flow tube group 19 is a farthest tube group in the windward tube row 4 which is the farthest from the refrigerant outlet 13, and the second ascending flow tube group 21 is a nearest tube group in the windward tube row 4 which is the nearest to the refrigerant outlet 13. Accordingly, descending flow tube groups each of which is composed of a plurality of heat exchange tubes 2 and in which the refrigerant flows from the upper side toward the lower side, and ascending flow tube groups each of which is composed of a plurality of heat exchange tubes 2 and in which the refrigerant flows from the lower side toward the upper side are provided in the leeward tube row 3 and the windward tube row 4 such that the descending flow tube groups and the ascending flow tube groups are alternately arranged.

The number of the heat exchange tubes 2 of the first descending flow tube group 18 of the leeward tube row 3 is equal to the number of the heat exchange tubes 2 of the second descending flow tube group 19 of the windward tube row 4. The widths of the two tube groups 18 and 19 as measured in the left-right direction are the same, and the two tube groups 18 and 19 constitute a single path. The total number of the heat exchange tubes 2 of the third descending flow tube group 16 and the first ascending flow tube group 17 is equal to the number of the heat exchange tubes 2 of the second ascending flow tube group 21, and the total width of the third descending flow tube group 16 and the first ascending flow tube group 17 as measured in the left-right direction is the same as the width of the second ascending flow tube group 21 as measured in the left-right direction. Each of the tube groups 16, 17, and 21 (tube groups other than the first descending flow tube group 18 and the second descending flow tube group 19) solely forms a single path.

The leeward upper header 5 has a leeward upper left compartment 24 (first compartment), a leeward upper central compartment 20 (second compartment), and a leeward upper right compartment 23. The leeward upper left compartment 24 is provided on the left end side, and the upper end portions of the heat exchange tubes 2 of the first descending flow tube group 18 communicate with the leeward upper left compartment 24. The leeward upper central compartment 20 is provided adjacent to and on the right side of the leeward upper left compartment 24, and the upper end portions of the heat exchange tubes 2 of the first ascending flow tube group 17 communicate with the leeward upper central compartment 20. The refrigerant flows out leftward from the leeward upper central compartment 20 toward the leeward upper left compartment 24. The leeward upper right compartment 23 is provided adjacent to and on the right side of the leeward upper central compartment 20, and the upper end portions of the heat exchange tubes 2 of the third descending flow tube group 16 communicate with the leeward upper right compartment 23. Since no partition is provided between the leeward upper left compartment 24 and the leeward upper central compartment 20, the refrigerant flows straight leftward from the leeward upper central compartment 20 and flows into the leeward upper left compartment 24. A plate-shaped dividing portion 22 is present between the leeward upper central compartment 20 and the leeward upper right compartment 23. The leeward upper right compartment 23 communicates with the refrigerant inlet 12.

The leeward lower header 6 has a leeward lower left compartment 27, a leeward lower central compartment 30, and a leeward lower right compartment 26. The leeward lower left compartment 27 is provided on the left end side, and the lower end portions of the heat exchange tubes 2 of the first descending flow tube group 18 communicate with the leeward lower left compartment 27. The leeward lower central compartment 30 is provided adjacent to and on the right side of the leeward lower left compartment 27, and the lower end portions of the heat exchange tubes 2 of the first ascending flow tube group 17 communicate with the leeward lower central compartment 30. The leeward lower right compartment 26 is provided adjacent to and on the right side of the leeward lower central compartment 30, and the lower end portions of the heat exchange tubes 2 of the third descending flow tube group 16 communicate with the leeward lower right compartment 26. The refrigerant flows out from the leeward lower right compartment 26 toward the leeward lower central compartment 30. A plate-shaped dividing portion 25 is present between the leeward lower left compartment 27 and the leeward lower central compartment 30. Since no partition is provided between the leeward lower central compartment 30 and the leeward lower right compartment 26, the refrigerant flows straight leftward from the leeward lower right compartment 26 and flows into the leeward lower central compartment 30.

The windward upper header 7 has a windward upper left compartment 29 (third compartment) and a windward upper right compartment 31. The windward upper left compartment 29 is provided on the left end side, and the upper end portions of the heat exchange tubes 2 of the second descending flow tube group 19 communicate with the windward upper left compartment 29. The windward upper right compartment 31 is provided adjacent to and on the right side of the windward upper left compartment 29, and the upper end portions of the heat exchange tubes 2 of the second ascending flow tube group 21 communicate with the windward upper right compartment 31. A plate-shaped dividing portion 28 is present between the windward upper left compartment 29 and the windward upper right compartment 31. The windward upper right compartment 31 communicates with the refrigerant outlet 13.

The windward lower header 8 has a windward lower left compartment 38 and a windward lower right compartment 32. The windward lower left compartment 38 is provided on the left end side, and the lower end portions of the heat exchange tubes 2 of the second descending flow tube group 19 communicate with the windward lower left compartment 38. The windward lower right compartment 32 is provided adjacent to and on the right side of the windward lower left compartment 38, and the lower end portions of the heat exchange tubes 2 of the second ascending flow tube group 21 communicate with the windward lower right compartment 32. The refrigerant from the windward lower left compartment 38 flows into the windward lower right compartment 32. Since no partition is provided between the windward lower left compartment 38 and the windward lower right compartment 32, the refrigerant flows straight rightward from the windward lower left compartment 38 and flows into the windward lower right compartment 32.

The lengths of the leeward upper left compartment 24, the leeward lower left compartment 27, the windward upper left compartment 29, and the windward lower left compartment 38 as measured in the left-right direction are equal to one another. The lengths of the leeward upper central compartment 20 and the leeward lower central compartment 30 as measured in the left-right direction are equal to each other. The lengths of the leeward upper right compartment 23 and the leeward lower right compartment 26 as measured in the left-right direction are equal to each other. Also, the lengths of the windward upper right compartment 31 and the windward lower right compartment 32 as measured in the left-right direction are equal to each other, and the lengths are equal to the sum of the lengths of the leeward upper central compartment 20 and the leeward upper right compartment 23 as measured in the left-right direction and are equal to the sum of the lengths of the leeward lower central compartment 30 and the leeward lower right compartment 26 as measured in the left-right direction.

A flow distribution control section for reinforcement 10 which has a refrigerant passage section 33 for establishing communication between the leeward upper left compartment 24 and the windward upper left compartment 29 is provided between the two compartments 24 and 29 such that the flow distribution control section for reinforcement 10 extends over the entire lengths and entire heights of the two compartments 24 and 29. The flow distribution control section for reinforcement 10 is formed by a part of the partition portion 9a which divides the interior of the upper tank 9 into the leeward upper header 5 and the windward upper header 7.

Communication between the leeward lower left compartment 27 and the windward lower left compartment 38 is established by a lower refrigerant passage section 34 which is formed by removing a part of the partition portion 11a which divides the interior of the lower tank 11 into the leeward lower header 6 and the windward lower header 8.

The refrigerant having flowed into the evaporator 1 through the refrigerant inlet 12 flows through two paths as described below and flows out from the refrigerant outlet 13. The first path is formed by the leeward upper right compartment 23, the third descending flow tube group 16, the leeward lower right compartment 26, the leeward lower central compartment 30, the first ascending flow tube group 17, the leeward upper central compartment 20, the leeward upper left compartment 24, the first descending flow tube group 18, the leeward lower left compartment 27, the lower refrigerant passage section 34, the windward lower left compartment 38, the windward lower right compartment 32, the second ascending flow tube group 21, and the windward upper right compartment 31. The second path is formed by the leeward upper right compartment 23, the third descending flow tube group 16, the leeward lower right compartment 26, the leeward lower central compartment 30, the first ascending flow tube group 17, the leeward upper central compartment 20, the leeward upper left compartment 24, the refrigerant passage section 33, the windward upper left compartment 29, the second descending flow tube group 19, the windward lower left compartment 38, the windward lower right compartment 32, the second ascending flow tube group 21, and the windward upper right compartment 31.

Figure 5:
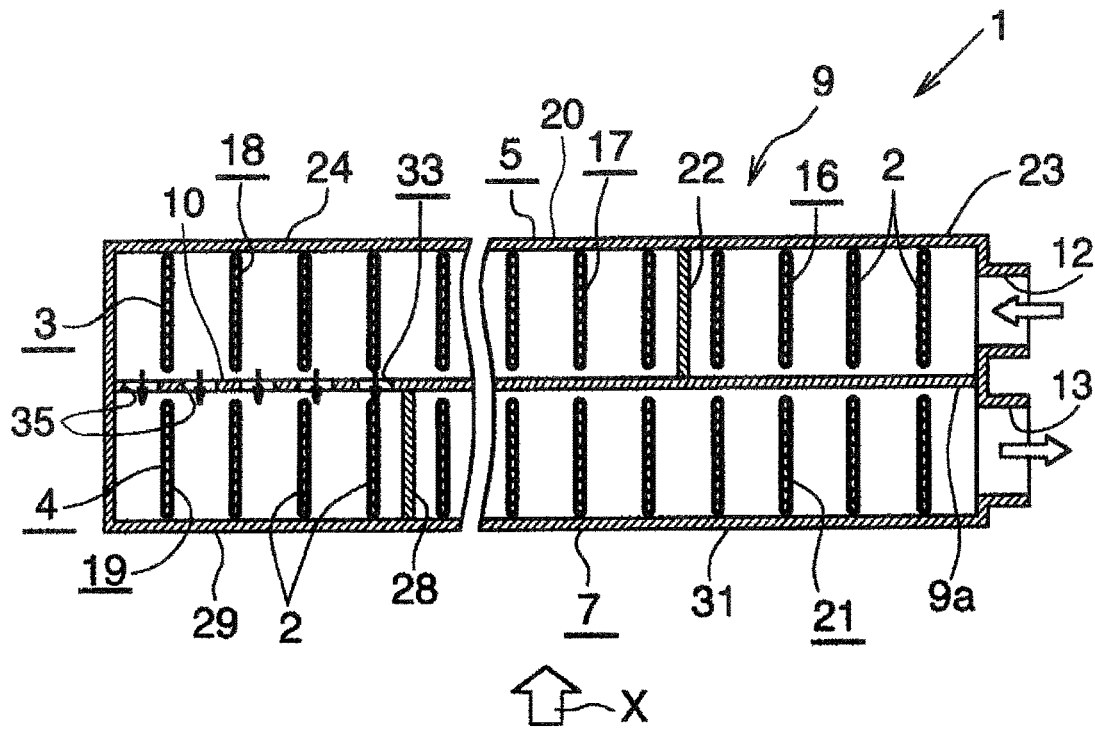
FIG. 5 is a sectional view taken along line C-C of FIG. 3.
Figure 6:
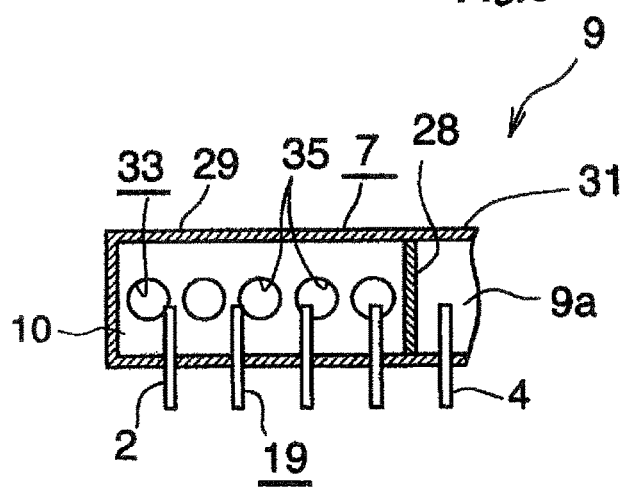
FIG. 6 is an enlarged view of a portion of FIG. 4.
Figure 7:
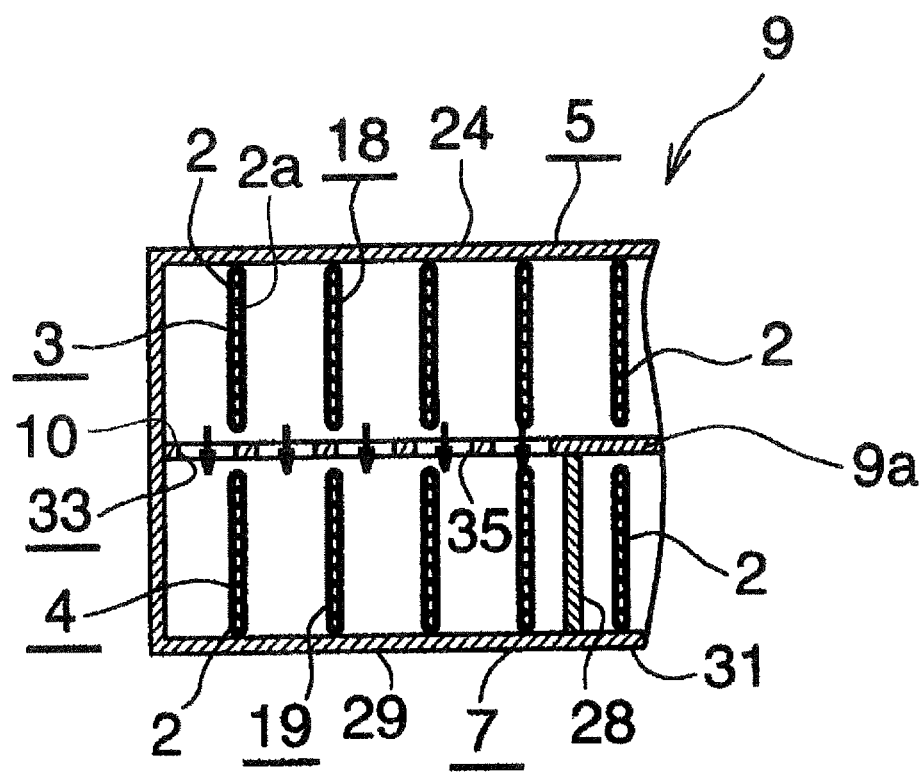
FIG. 7 is an enlarged view of a portion of FIG. 5.

As shown in FIGS. 5 to 7, a plurality of through holes 35 for establishing communication between the leeward upper left compartment 24 and the windward upper left compartment 29 are formed in a part of the partition portion 9a of the upper tank 9, which part is located between the leeward upper left compartment 24 and the windward upper left compartment 29, such that the through holes 35 are spaced from one another in the left-right direction. The refrigerant passage section 33 is constituted by all the through holes 35. As a result, the part of the partition portion 9a located between the two compartments 24 and 29 serves as the flow distribution control section for reinforcement 10 having the refrigerant passage section 33. The lower end of each through hole 35 is separated upward from the bottom surfaces of the internal spaces of the leeward upper left compartment 24 and the windward upper left compartment 29, and the lower ends of all the through holes 35 are located at the same vertical position. Also, the lower ends of all the through holes 35 are located at a vertical position below the upper ends of the first and second descending flow tube groups 18 and 19 which are descending flow tube groups constituting a single path.

The total area of all the through holes 35 which constitute the refrigerant passage section 33 is greater than the total passage sectional area of the refrigerant passages 2a of all the heat exchange tubes 2 of the first descending flow tube group 18, which is a descending flow tube group of the leeward tube row 3, which group constitutes the above-mentioned single path. Namely, in the case where the total area of all the through holes 35 which constitute the refrigerant passage section 33 is represented by A, and the total passage sectional area of the refrigerant passages 2a of all the heat exchange tubes 2 of the first descending flow tube group 18 is represented by B, a relation of A>B is satisfied. Further, it is preferred that the total area of all the through holes 35 which constitute the refrigerant passage section 33 is equal to or less than 40% of the area of the flow distribution control section for reinforcement 10 in which the refrigerant passage section 33 is formed.

As shown in FIG. 8, the lower refrigerant passage section 34 for establishing communication between the leeward lower left compartment 27 of the leeward lower header 6 and the windward lower left compartment 38 of the windward lower header 8 is composed of a single through hole 36 which is formed by removing a part of the partition portion 11a which divides the interior of the lower tank 11 into the leeward lower header 6 and the windward lower header 8, the part extending over the entire length of the leeward lower left compartment 27. The through hole 36 is formed over the entire height and entire length of the leeward lower left compartment 27.

The above-described evaporator 1, together with a compressor, a condenser serving as a refrigerant cooler, and an expansion valve serving as a pressure reducer, constitutes a refrigeration cycle which is installed in a vehicle, such as an automobile, as a car air conditioner. When the car air conditioner is operated, the refrigerant having passed through the compressor, the condenser, and the expansion valve enters the evaporator 1 through the refrigerant inlet 12. The refrigerant then flows through the above-described two paths and flows out from the refrigerant outlet 13. While the refrigerant flows through the heat exchange tubes 2 of the leeward tube row 3 and the heat exchange tubes 2 of the windward tube row 4, heat exchange is performed between the refrigerant and air passing through the air-passing clearances between the adjacent heat exchange tubes 2, whereby the air is cooled, and the refrigerant flows out in the gas phase.

In the above-described evaporator 1, the lower ends of all the through holes 35 which constitute the refrigerant passage section 33 are separated upward from the bottom surfaces of the internal spaces of the leeward upper left compartment 24 and the windward upper left compartment 29, and the lower ends of all the through holes 35 are located at the same vertical position; the lower ends of all the through holes 35 are located at a vertical position below the upper ends of the first and second descending flow tube groups 18 and 19 which are descending flow tube groups constituting the above-mentioned single path; and the total area of all the through holes 35 which constitute the refrigerant passage section 33 is greater than the total passage sectional area of the refrigerant passages 2a of all the heat exchange tubes 2 of the first descending flow tube group 18. Therefore, the refrigerant having flowed from the first ascending flow tube group 17 into the leeward upper central compartment 20 and then flowed into the leeward upper left compartment 24 flows more easily into the windward upper left compartment 29 through the refrigerant passage section 33 than into the heat exchange tubes 2 of the first descending flow tube group 18. In addition, it is possible to present the amount of refrigerant flowing into the windward upper left compartment 29 through the refrigerant passage section 33 from becoming excessively large. Accordingly, the amounts of the refrigerant flowing through all the heat exchange tubes 2 of the first descending flow tube group 18 and the second descending flow tube group 19 of the leeward and windward tube rows 3 and 4, which groups constitute a single path, can be equalized, whereby the cooling performance of the evaporator 1 becomes excellent.

The present invention comprises the following modes.

1) An evaporator comprising:

a first upper header;

a first lower header disposed below the first upper header to be parallel to the first upper header;

a plurality of first heat exchange tubes which are disposed between the first upper header and the first lower header and whose upper and lower end portions are connected to the first upper header and the first lower header, respectively;

a first descending flow tube group which is composed of a plurality of the first heat exchange tubes and in which refrigerant flows from an upper side toward a lower side thereof;

a first ascending flow tube group which is composed of a plurality of the first heat exchange tubes, in which the refrigerant flows from a lower side toward an upper side thereof, and which is provided adjacent to the first descending flow tube group;

a first compartment which is provided in the first upper header and with which an upper end portion of the first descending flow tube group communicates;

a second compartment which is provided in the first upper header to be located adjacent to the first compartment, with which an upper end portion of the first ascending flow tube group communicates, and from which the refrigerant flows out toward the first compartment;

a second upper header disposed to be parallel to the first upper header;

a second lower header disposed below the second upper header to be parallel to the second upper header and the first lower header;

a plurality of second heat exchange tubes which are disposed between the second upper header and the second lower header and whose upper and lower end portions are connected to the second upper header and the second lower header, respectively;

a second descending flow tube group which is composed of a plurality of the second heat exchange tubes, in which the refrigerant flows from an upper side toward a lower side thereof, and which is provided oppose to the first descending flow tube group in an air-passage direction;

a third compartment which is provided in the second upper header and with which an upper end portion of the second descending flow tube group communicates; and a flow distribution control section for reinforcement which is provided between the first compartment and the third compartment such that the flow distribution control section extends over the entire lengths and heights of the first compartment and the third compartment and which has a refrigerant passage section for establishing communication between the first compartment and the third compartment, wherein upper end portions of the heat exchange tubes of the first descending flow tube group, which portions have a predetermined length, are intruded into the first compartment, and upper end portions of the heat exchange tubes of the second descending flow tube group, which portions have a predetermined length, are intruded into the third compartment, wherein the refrigerant passage section is composed of a plurality of through holes formed in the flow distribution control section for reinforcement at intervals in the longitudinal direction of the two upper headers, the lower end of each through hole is separated upward from the bottoms of the first and third compartments, the lower ends of all the through holes which constitute the refrigerant passage section are located at a vertical position below the upper ends of all the heat exchange tubes of the first and second descending flow tube groups, and a relation of A>B is satisfied where A represents the total area of all the through holes which constitute the refrigerant passage section, and B represents the total passage sectional area of the refrigerant passages of all the heat exchange tubes of the first descending flow tube group.

2) The evaporator described in par. 1), wherein the total area of all the through holes which constitute the refrigerant passage section is equal to or less than 40% of the area of the flow distribution control section for reinforcement.

3) The evaporator described in par. 1), wherein the lower ends of all the through holes which constitute the refrigerant passage section are located at the same vertical position, and the upper ends of all the heat exchange tubes of the first and second descending flow tube groups are located at the same vertical position.

4) The evaporator described in par. 1), wherein all the through holes which constitute the refrigerant passage section have the same area.

5) The evaporator described in par. 1), wherein the first upper header is disposed on a leeward side of the second upper header, and the first lower header is disposed on a leeward side of the second lower header.

6) The evaporator described in par. 1), wherein a refrigerant inlet is provided at one end of the first upper header, and a refrigerant outlet is provided at one end of the second upper header, which end is located on the same side as the refrigerant inlet; and the first descending flow tube group and the second descending flow tube group are provided on a side opposite the refrigerant inlet and the refrigerant outlet.

The evaporator according to any one of pars. 1) to 6) comprises: a first upper header; a first lower header disposed below the first upper header to be parallel to the first upper header; a plurality of first heat exchange tubes which are disposed between the first upper header and the first lower header and whose upper and lower end portions are connected to the first upper header and the first lower header, respectively; a first descending flow tube group which is composed of a plurality of the first heat exchange tubes and in which refrigerant flows from an upper side toward a lower side thereof; a first ascending flow tube group which is composed of a plurality of the first heat exchange tubes, in which the refrigerant flows from a lower side toward an upper side thereof, and which is provided adjacent to the first descending flow tube group; a first compartment which is provided in the first upper header and with which an upper end portion of the first descending flow tube group communicates; a second compartment which is provided in the first upper header to be located adjacent to the first compartment, with which an upper end portion of the first ascending flow tube group communicates, and from which the refrigerant flows out toward the first compartment; a second upper header disposed to be parallel to the first upper header; a second lower header disposed below the second upper header to be parallel to the second upper header and the first lower header; a plurality of second heat exchange tubes which are disposed between the second upper header and the second lower header and whose upper and lower end portions are connected to the second upper header and the second lower header, respectively; a second descending flow tube group which is composed of a plurality of the second heat exchange tubes, in which the refrigerant flows from an upper side toward a lower side thereof, and which is provided oppose to the first descending flow tube group in an air-passage direction; a third compartment which is provided in the second upper header and with which an upper end portion of the second descending flow tube group communicates; and a flow distribution control section for reinforcement which is provided between the first compartment and the third compartment such that the flow distribution control section extends over the entire lengths and heights of the first compartment and the third compartment and which has a refrigerant passage section for establishing communication between the first compartment and the third compartment, wherein upper end portions of the heat exchange tubes of the first descending flow tube group, which portions have a predetermined length, are intruded into the first compartment, and upper end portions of the heat exchange tubes of the second descending flow tube group, which portions have a predetermined length, are intruded into the third compartment, wherein the refrigerant passage section is composed of a plurality of through holes formed in the flow distribution control section for reinforcement at intervals in the longitudinal direction of the two upper headers, the lower end of each through hole is separated upward from the bottoms of the first and third compartments, the lower ends of all the through holes which constitute the refrigerant passage section are located at a vertical position below the upper ends of all the heat exchange tubes of the first and second descending flow tube groups, and a relation of A>B is satisfied where A represents the total area of all the through holes which constitute the refrigerant passage section, and B represents the total passage sectional area of the refrigerant passages of all the heat exchange tubes of the first descending flow tube group. Therefore, the refrigerant having flowed from the first ascending flow tube group into the second compartment and then flowed into the first compartment flows more easily into the third compartment through the refrigerant passage section than into the heat exchange tubes of the first descending flow tube group. In addition, it is possible to present the amount of refrigerant flowing into the third compartment through the refrigerant passage section from becoming excessively large. Accordingly, the amounts of the refrigerant flowing through all the heat exchange tubes of the first descending flow tube group and the second descending flow tube group which constitute a single path can be equalized, whereby the cooling performance of the evaporator becomes excellent.

Further, a decrease in the withstanding pressure of the tank having the leeward upper header and the windward upper header is suppressed by the action of the flow distribution control section for reinforcement.

According to the evaporator of par. 2), the decrease in the withstanding pressure of the tank having the leeward upper header and the windward upper header is effectively suppressed by the action of the flow distribution control section for reinforcement.

What is claimed is:

1. An evaporator comprising:
   a first upper header;
   a first lower header disposed below the first upper header to be parallel to the first upper header;
   a plurality of first heat exchange tubes which are disposed between the first upper header and the first lower header and whose upper and lower end portions are connected to the first upper header and the first lower header, respectively;
   a first descending flow tube group which is composed of a plurality of the first heat exchange tubes and in which refrigerant flows from an upper side toward a lower side thereof;
   a first ascending flow tube group which is composed of a plurality of the first heat exchange tubes, in which the refrigerant flows from a lower side toward an upper side thereof, and which is provided adjacent to the first descending flow tube group;
   a first compartment which is provided in the first upper header and with which an upper end portion of the first descending flow tube group communicates;
   a second compartment which is provided in the first upper header to be located adjacent to the first compartment, with which an upper end portion of the first ascending flow tube group communicates, and from which the refrigerant flows out toward the first compartment;
   a second upper header disposed to be parallel to the first upper header;
   a second lower header disposed below the second upper header to be parallel to the second upper header and the first lower header;
   a plurality of second heat exchange tubes which are disposed between the second upper header and the second lower header and whose upper and lower end portions are connected to the second upper header and the second lower header, respectively;
   a second descending flow tube group which is composed of a plurality of the second heat exchange tubes, in which the refrigerant flows from an upper side toward a lower side thereof, and which is provided oppose to the first descending flow tube group in an air-passage direction;
   a third compartment which is provided in the second upper header and with which an upper end portion of the second descending flow tube group communicates; and
   a flow distribution control section for reinforcement which is provided between the first compartment and the third compartment such that the flow distribution control section extends over the entire lengths and heights of the first compartment and the third compartment and which has a refrigerant passage section for establishing communication between the first compartment and the third compartment,
   wherein upper end portions of the heat exchange tubes of the first descending flow tube group, which portions have a predetermined length, are intruded into the first compartment, and upper end portions of the heat exchange tubes of the second descending flow tube group, which portions have a predetermined length, are intruded into the third compartment,
   wherein the refrigerant passage section is composed of a plurality of through holes formed in the flow distribution control section for reinforcement at intervals in the longitudinal direction of the two upper headers,
   the lower end of each through hole is separated upward from the bottoms of the first and third compartments,
   the lower ends of all the through holes which constitute the refrigerant passage section are located at a vertical position below the upper ends of all the heat exchange tubes of the first and second descending flow tube groups, and
   a relation of A>B is satisfied where A represents the total area of all the through holes which constitute the refrigerant passage section, and B represents the total passage sectional area of the refrigerant passages of all the heat exchange tubes of the first descending flow tube group.

2. The evaporator according to claim 1, wherein the total area of all the through holes which constitute the refrigerant passage section is equal to or less than 40% of the area of the flow distribution control section for reinforcement.

3. The evaporator according to claim 1, wherein the lower ends of all the through holes which constitute the refrigerant passage section are located at the same vertical position, and the upper ends of all the heat exchange tubes of the first and second descending flow tube groups are located at the same vertical position.

4. The evaporator according to claim 1, wherein all the through holes which constitute the refrigerant passage section have the same area.

5. The evaporator according to claim 1, wherein the first upper header is disposed on a leeward side of the second upper header, and the first lower header is disposed on a leeward side of the second lower header.

6. The evaporator according to claim 1, wherein
   a refrigerant inlet is provided at one end of the first upper header, and a refrigerant outlet is provided at one end of the second upper header, which end is located on the same side as the refrigerant inlet; and
   the first descending flow tube group and the second descending flow tube group are provided on a side opposite the refrigerant inlet and the refrigerant outlet.

* * * * *